United States Patent
Rajamanickam et al.

(10) Patent No.: US 11,671,360 B2
(45) Date of Patent: Jun. 6, 2023

(54) SELECTING FORWARDING PATHS AND RETURN PATHS IN A NETWORKED ENVIRONMENT

(71) Applicant: Cisco Technology, Inc., San Jose, CA (US)

(72) Inventors: Jaganbabu Rajamanickam, Kanata (CA); Nagendra Kumar Nainar, Morrisville, NC (US); Darren Russell Dukes, Ottawa (CA); Carlos M. Pignataro, Cary, NC (US); Madhan Sankaranarayanan, Tamilnadu (IN)

(73) Assignee: Cisco Technology, Inc., San Jose, CA (US)

( * ) Notice: Subject to any disclaimer, the term of this patent is extended or adjusted under 35 U.S.C. 154(b) by 238 days.

(21) Appl. No.: 17/089,481

(22) Filed: Nov. 4, 2020

(65) Prior Publication Data
US 2022/0141131 A1 May 5, 2022

(51) Int. Cl.
*H04L 45/00* (2022.01)
*H04L 43/087* (2022.01)
*H04L 43/12* (2022.01)
*H04L 45/02* (2022.01)
*H04L 45/74* (2022.01)

(52) U.S. Cl.
CPC ............ *H04L 45/70* (2013.01); *H04L 43/087* (2013.01); *H04L 43/12* (2013.01); *H04L 45/02* (2013.01); *H04L 45/74* (2013.01)

(58) Field of Classification Search
CPC ....... H04L 45/70; H04L 43/087; H04L 43/12; H04L 45/02; H04L 45/74; H04L 43/20; H04L 45/123; H04L 45/26; H04L 45/645; H04L 45/76; H04L 43/08; H04L 43/10
See application file for complete search history.

(56) References Cited

U.S. PATENT DOCUMENTS

| | | | |
|---|---|---|---|
| 10,666,548 B2 * | 5/2020 | Bernardi | H04L 45/26 |
| 10,749,785 B1 | 8/2020 | Thangavel et al. | |
| 2013/0229922 A1 * | 9/2013 | Li | H04L 41/0659 370/242 |
| 2014/0269266 A1 | 9/2014 | Filsfils et al. | |
| 2015/0381486 A1 | 12/2015 | Xiao et al. | |
| 2017/0078176 A1 | 3/2017 | Lakshmikantha et al. | |
| 2021/0250292 A1 * | 8/2021 | Yao | H04L 12/4633 |
| 2022/0103661 A1 * | 3/2022 | Goel | H04L 47/18 |

OTHER PUBLICATIONS

The International Search Report and Written Opinion for PCT Application No. PCT/US21/57074, dated Feb. 8, 2022.

* cited by examiner

*Primary Examiner* — Kibrom T Hailu
(74) *Attorney, Agent, or Firm* — Lee & Hayes, P.C.

(57) ABSTRACT

Techniques for utilizing edge nodes disposed throughout a multi-site cloud computing network to generate a probe packet including indicators that guarantee the use of forward and return route paths to accurately measure the network performance of a route path between two endpoints in a wide area network (WAN). An edge node disposed in a site of the multi-site cloud computing network may store in virtual memory associated with the edge node, a mapping between route paths, usable to send data from the edge node to remote edge nodes in remote sites, and route indicators. A probe packet may include a data portion for measuring the network performance of a route path, a portion including local and remote discriminators, and/or an inner and an outer header.

20 Claims, 7 Drawing Sheets

SELECTING FORWARDING PATHS AND RETURN PATHS IN A NETWORKED ENVIRONMENT

TECHNICAL FIELD

The present disclosure relates generally to utilizing edge nodes to generate a probe packet including indicators that guarantee the use of forward and return route paths to accurately measure the network performance of a route path between two endpoints in a wide area network.

BACKGROUND

Cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth. As datacenters continue to grow and expand to multi-site cloud environments, the need for efficient, stateless monitoring of network performance information, such as, for example, latency, packet loss, and jitter between edge nodes of respective sites becomes more apparent. For example, monitoring the performance of the network relies on probe packets initiated by one edge node and responded to by another, and monitoring multiple paths between the edge nodes may prove difficult and unreliable using traditional techniques.

Software-Defined-Networks (SDNs) rely heavily on performance measurement over different wide area network (WAN) circuits that will be utilized to identify and select the most favorable WAN circuit. For example, a service provider may offer service-level agreements to clients. Particular aspects of such a service may include ensured quality, availability, and responsibilities of the supplied services. Current techniques use quality of service marking between WAN edge nodes and provider edge nodes to identify a service-level agreement which may vary between WAN edges nodes and provider edge nodes within the same domain or different domains. In other words, the current measurement is a best effort basis and does not accurately measure the performance on a per service-level agreement basis.

Measurements are currently two-way and failure in the returning direction may be hard to detect. For example, traditional techniques utilized to collect and monitor the performance of respective paths through the network is achieved by sending probe packets and using the response to detect any packet loss. However, delay in return response may result in assuming delay in forwarding direction as well or may indicate a false negative with respect to packet loss. Additionally, the timestamp of sending the probe and receiving the response is used to measure the two-way round-trip time of a route path. However, these two-way round-trip times generally fall short of the standard for accuracy needed to evaluate the network performance of a route path, and the responding node may not necessarily utilize the same type of path. While utilizing two-way measurements may be effective for loosely gauging network performance, multiple policies created for a same destination with differing service-level agreement parameters such as, jitter, loss, and latency may lead to multiple paths to the same destination, and the current two-way measurements do not ensure that a remote node will select a proper return path. Thus, current two-way measurements merely add up to a best effort fashion with very low reliability to accurately measure latency, loss, and jitter.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
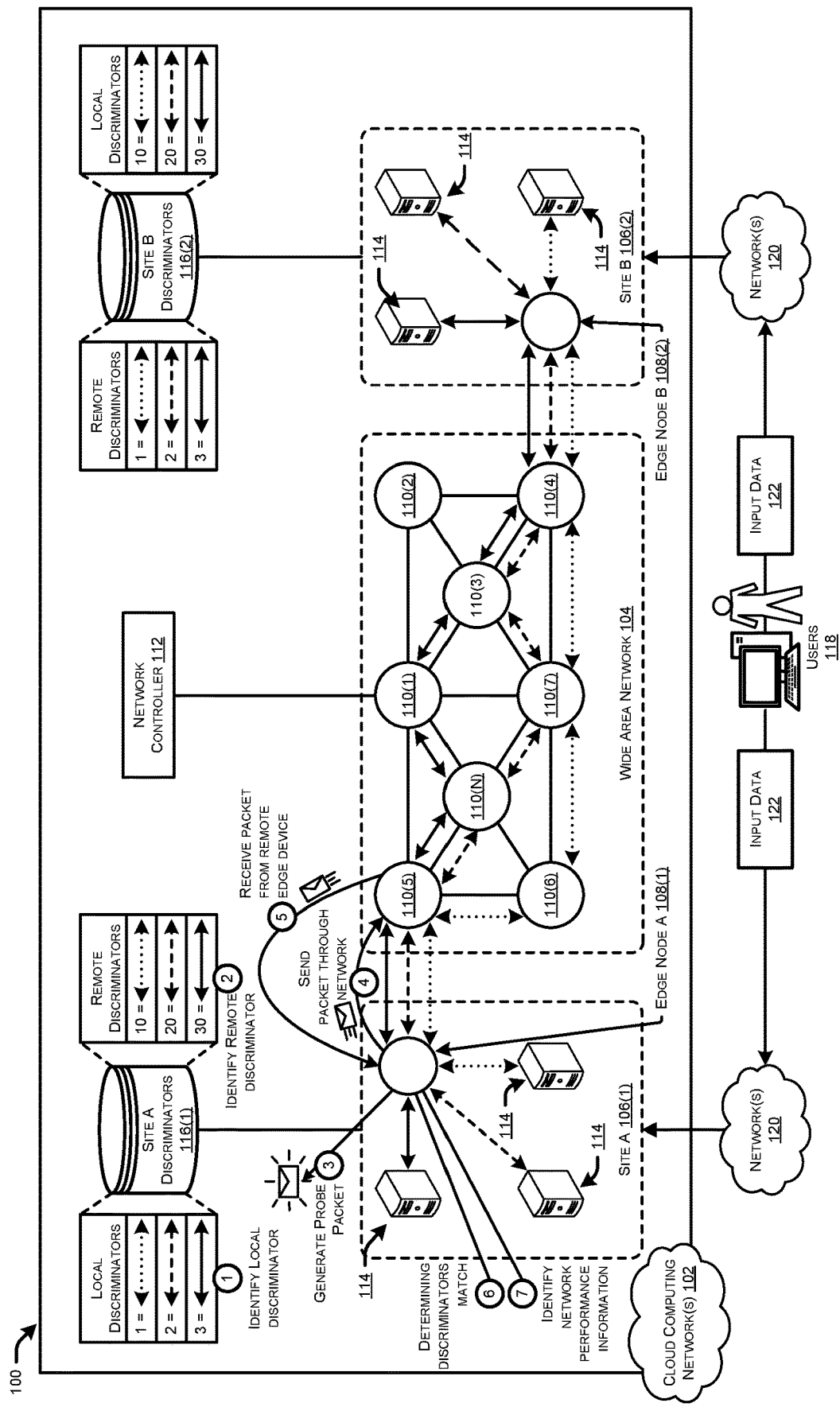
FIG. 1A illustrates a system-architecture diagram of an example flow for a local edge node to identify local and remote route discriminators to generate a probe packet, configured to forward to a remote edge node and return on a route specified by the discriminators, and measure network performance of the specified network route path.

This disclosure describes a method of utilizing a local edge node to generate a probe packet including indicators that guarantee the use of forward and return route paths to accurately measure the network performance of a route path between the local edge node and a remote edge node in a wide area network. The method includes identifying, by a first device in a first site of a multi-site network, a first local discriminator indicating a particular route path of multiple route paths usable to send data from the first device to a second device in a second site of the multi-site network. The method may further include identifying, by the first device, a first remote discriminator indicating the particular route path from the second device to the first device. The method may further include generating, by the first device, a first probe packet including the first local discriminator and the first remote discriminator. The method may further include utilizing the first local discriminator to send, from the first device, the first probe packet through the particular route path through the multi-site network to the second device. The method may further include receiving, at the first device and from the second device, a second probe packet including a second local discriminator associated with the particular route path and a second remote discriminator associated with the particular route path. The method may further include determining, by the first device, that the first local discriminator is equal to the second remote discriminator. The method may further include identifying, at the first device and based at least in part on receiving the second probe packet, network performance information associated with the particular route path.

Additionally, the method includes identifying, by a first device in a first site of a multi-site network, a local forwarding identifier associated with the first device. In some examples, the local forwarding identifier may indicate a particular route path of multiple route paths usable to send data from the first device to a second device in a second site of the multi-site network. The method may further include identifying, by the first device, a remote forwarding identifier associated with the second device. In some examples, the remote forwarding identifier may indicate the particular route path. The method may further include generating, by the first device, a probe packet having a first header that includes the remote forwarding identifier. The method may further include encapsulating, by the first device, the probe packet with a second header that includes the local forwarding identifier. The method may further include sending, from the first device to the second device, the probe packet, wherein the probe packet is configured to utilize the particular route path from the first device to the second device. The method may further include receiving, at the first device and from the second device, the probe packet having the first header. The method may further include identifying, at the first device and based at least in part on receiving the probe packet, network performance information associated with the particular route path.

Additionally, or alternatively, the method includes identifying, by a first device in a first site of a multi-site network, a local forwarding identifier indicating a first route path of multiple route paths usable to send data from the first device to a second device in a second site of the multi-site network. The method may further include identifying, by the first device, a first remote forwarding identifier indicating the first route path usable to send data from the second device to the first device. The method may further include identifying, by the first device, a second remote forwarding identifier indicating a second route path of the multiple route paths usable to send data from the second device to the first device. The method may further include generating, by the first device, a first probe packet having a first outer header that includes the local forwarding identifier and a first inner header that includes the first remote forwarding identifier. The method may further include generating, by the first device, a second probe packet having a second outer header that includes the local forwarding identifier and a second inner header that includes the second remote forwarding identifier. The method may further include sending, from the first device to the second device, the first probe packet and the second probe packet, wherein the first probe packet and the second probe packet are configured to utilize the first route path from the first device to the second device. The method may further include utilizing the first route path to receive, at the first device and from the second device, the first probe packet. The method may further include utilizing the second route path to receive, at the first device and from the second device, the second probe packet. The method may further include identifying, at the first device and based at least in part on receiving the first probe packet and the second probe packet network performance information associated with the first route path and the second route path.

Additionally, the techniques described herein may be performed by a system and/or device having non-transitory computer-readable media storing computer-executable instructions that, when executed by one or more processors, performs the method described above.

Example Embodiments

As discussed above, software-defined-networks (SDNs) rely on performance measurement of wide area network (WAN) circuits to identify and select the most favorable WAN circuits to utilize for service-level agreements offered to clients that ensure quality, availability, and responsibilities of offered services. While utilizing two-way measurements may be effective for loosely gauging network performance, the multiple policies created for a same destination with differing service-level agreement parameters such as, jitter, loss, and latency may lead to multiple paths to the same destination, and the current two-way measurements do not ensure that a remote node will select a proper return path.

This disclosure describes techniques for a local edge node (also referred to as edge device(s)), disposed in a first site of a multi-site network, to identify local and remote discriminators and/or forwarding identifiers for use in generating one or more probe packets configured to forward through a WAN to a remote edge node, disposed in a second site of the multi-site network, on a specified route and return on the specified route or an additional specified route to measure network performance of the specified network route path. The edge devices may utilize local and remote discriminators to generate a probe packet specifying a forward path from the local edge device and a return path from the remote edge device. Additionally, or alternatively, the edge devices may utilize local and remote forwarding identifiers, such as, for example, differentiated service code point (DSCP) values, to generate a packet having an inner header causing the packet to follow the route path specified by the remote forwarding identifier and encapsulate the packet with an outer header causing the packet to follow the route path specified by the local forwarding identifier. Additionally, or alternatively, the edge devices may generate more than one probe packet configured to return paths having differing protocols, such as, for example, a path utilizing a multi-protocol label switching (MPLS) circuit, a path utilizing a segment routed circuit, a path utilizing a pseudowire circuit, a path utilizing an internet circuit, and/or a path utilizing a 5G/Long-Term Evolution (LTE) circuit. According to the techniques and mechanisms described herein, an example cloud computing network may have one or more edge devices (also referred to as edge nodes), one or more intermediate devices (also referred to as intermediate nodes/WAN circuits), and a network controller.

The cloud computing network may include one or more network devices. In some examples, the network devices may be configured as a spine network device, a leaf network device, and/or an edge network device. In some examples, the cloud computing network may include a network controller. The network controller associated with the cloud computing network may know the available paths between a first edge node disposed in a first site of the network and a second edge node disposed in a second site of the network. The network controller may assign a discriminator to each of the paths and may distribute the discriminators to all of the edge nodes in the network, such as, for example, the first edge node and the second edge node. Additionally, or alternatively, each edge node in the network, such as, for example, the first edge node and the second edge node may know of the paths from the respective local edge node to each remote edge node, and may assign a discriminator to each path and notify the network controller of such mapping. Additionally, or alternatively, the network controller may distribute forwarding identifiers, such as, for example differentiated services code point (DSCP) values or segment routing segment identifiers (SR SIDs), for each path to each edge node in the network.

The edge nodes may be configured to have a virtual memory for storing the route discriminators and/or forwarding identifiers. For example, a first edge node disposed in a first site of the cloud computing network may have a first site discriminators database. In some examples, the first site discriminators database may include a local discriminators database and/or a remote discriminators database. For example, the local discriminators database may include one or more mappings between local discriminators and an associated route from the first edge device to a second edge device disposed in a second site of the cloud computing network. Additionally, or alternatively, the remote discriminators database may include one or more mappings between remote discriminators an associated route from the second edge device to the first edge device. In some examples, a local discriminator, corresponding to a first route from the first edge device to the second edge device utilizing a first path, may correspond to a remote discriminator, corresponding to a second route from the second edge device to the first edge device utilizing the first path. Additionally, or alternatively, the first edge node may have a first forwarding identifier database. In some examples, the first forwarding identifier database may include a local forwarding identifier database and/or a remote forwarding identifier database. For example, the local forwarding identifier database may include one or more mappings between local forwarding identifiers and an associated route from the first edge device to the second edge device. Additionally, or alternatively, the remote forwarding identifier databased may include one or more mappings between remote forwarding identifiers and an associated route from the second edge device to the first edge device. In some examples, a local forwarding identifier, corresponding to a first route from the first edge device to the second edge device utilizing a first path may correspond to a remote forwarding identifier, corresponding to a second route from the second edge device to the first edge device utilizing the first path.

In some examples, a first edge node in a first site of the cloud computing network may generate a probe packet to send through the WAN to a second edge node of the cloud computing network. In some examples, the probe packet may be utilized to gather data to measure various network performance information associated with the route between the first edge node and the second edge node. For example, the probe packet may be utilized to measure network latency associated with a particular route path, network packet loss associated with a particular route path, and/or network jitter associated with a particular route path. In some example, an edge node may generate a probe packet that includes a data portion and an indication of a local discriminator and a remote discriminator. Additionally, or alternatively, an edge node may generate a probe packet that includes a data portion, an inner header portion specifying a remote forwarding identifier, and an outer header portion specifying a local forwarding identifier. Additionally, or alternatively, an edge node may generate two separate probe packets having differing inner headers specifying respective remote forwarding identifiers, and a shared outer header portion specifying a local forwarding identifier. In some examples, the outer header portion may encapsulate the probe packet, or at least the inner header portion of the probe packet. In some examples, the data portion may be utilized to measure the network performance information of a utilized route path.

The edge nodes may have further virtual memory configured to store a mapping between network performance information, received from a probe packet utilizing a specified route path, a route path, and/or discriminator and/or forwarding identifier associated with the route path. For example, a first edge device may have a portion of virtual memory configured as a network performance database. In some examples, the first edge device may send a probe packet to a second edge device and receive the probe packet back from the second edge device. The first edge device may verify that the received probe packet utilized the correct path by identifying a specified remote forwarding identifier and/or comparing a remote discriminator to a local discriminator. The edge device may then identify network performance information associated with the specified path and store the network performance information in association with the specified local and/or remote forwarding identifier, the local and/or remote discriminator, and/or the specified route path.

In an example cloud computing network, a network controller, a first network site including one or more first nodes and a first edge node, a second network site including one or more second nodes and a second edge node, and a WAN including one or more intermediate nodes may be disposed in a multi-site network.

The network controller may assign a discriminator to each route path between respective edge devices and distribute the discriminators to all of the edge nodes in the network. For example, the network controller may send data to the first edge node including local route discriminators indicating one or more route paths from the first edge node to the second edge node and/or remote route discriminators indicating one or more route paths from the second edge node to the first edge node. Additionally, or alternatively, the network controller may send data to the second edge node including local route discriminators indicating one or more route paths from the second edge node to the first edge node and/or remote discriminators indicating one or more route paths from the first edge node to the second edge node. Additionally, or alternatively, the network controller may send data to the first edge node including local forwarding identifiers associated with one or more route paths from the first edge node to the second edge node and/or remote forwarding identifiers associated with one or more route paths from the second edge node to the first edge node. Additionally, or alternatively, the network controller may send data to the second edge node including local forwarding identifiers associated with one or more route paths from the second edge node to the first edge node and/or remote forwarding identifiers associated with one or more route paths from the first edge node to the second edge node.

The edge nodes may be configured such that each edge node may identify the paths from the respective local edge node to the respective remote edge node and may assign a discriminator to each path and notify the network controller of such a mapping. For example, the first edge node may assign a unique discriminator to each route path from the first edge node to the second edge node and send data representing the discriminators to the network controller. Additionally, or alternatively, the second edge node may assign a unique discriminator to each route path from the second edge node to the first edge node and send data representing the discriminators to the network controller.

In some examples, the first edge node may identify, in first virtual memory associated with the first edge node, a first local discriminator indicating a particular route path of multiple route paths usable to send data from the first edge node to the second edge node. Additionally, or alternatively, the first edge node may be configured to identify, in the first virtual memory, a first remote discriminator indicating the particular route path from the second device to the first device.

In some examples, the first edge node may generate a first probe packet including the first local discriminator and the first remote discriminator. In some examples, the first probe packet may include a data portion for transmitting data and/or utilized for measuring network performance, such as, for example, network jitter, network loss, and/or network latency associated with the particular route path. Additionally, or alternatively, the first probe packet may include a portion for specifying the first local discriminator and the first remote discriminator.

In some examples, the first edge node may send the first probe packet through the particular route path through the multi-site network to the second edge node. For example, the first edge node may utilize the first local discriminator to identify the particular route path and send the first probe packet through the particular route path.

In some examples, the first edge node may receive a second probe packet from the second edge node. For example, the second edge node may identify, in second virtual memory associated with the second edge node, a second local discriminator corresponding to the first remote discriminator, and a second remote discriminator corresponding to the first local discriminator included in the first probe packet. Additionally, or alternatively, the second edge node may generate a second probe packet including the second local discriminator associated with the particular route path and the second remote discriminator associated with the particular route path. In some examples, the second local discriminator may correspond to the first remote discriminator. Additionally, or alternatively, the second remote discriminator may correspond to the first local discriminator.

In some examples, the first edge node may verify that the second probe packet utilized the particular route path from the second edge node. For example, the first edge node may determine that the first local discriminator is equal to the second remote discriminator. Additionally, or alternatively, the first edge node may determine that the first remote discriminator is equal to the second local discriminator.

In some examples, the first edge node may identify network performance information associated with the particular route path. For example, the first edge node may utilize the data included in the second probe packet to measure network performance associated with the particular route path, such as, for example, network jitter, network loss, and/or network latency. Additionally, or alternatively, the first edge node may store the network performance information in the first virtual memory. Additionally, or alternatively, the first edge node may send data indicating the network performance information to the network controller.

Additionally, or alternatively, the first edge node may identify, in the first virtual memory associated with the first edge node, a local forwarding identifier associated with the first edge node. In some examples, the local forwarding identifier may indicate a particular route path of multiple route paths usable to send data from the first edge node to the second edge node. Additionally, or alternatively, the first edge node may identify, in the first virtual memory, a remote forwarding identifier associated with the second edge node. In some examples, the remote forwarding identifier may indicate the particular route path of multiple route paths to send data from the second edge node to the first edge node.

In some examples, the first edge node may generate a probe packet. In some examples, the probe packet may include first header that includes the remote forwarding identifier. Additionally, or alternatively, the probe packet may include a data portion for transmitting data and/or utilized for measuring network performance, such as, for example, network jitter, network loss, and/or network latency associated with the particular route path. Additionally, or alternatively, the first edge node may encapsulate the probe packet with a second header that includes the local forwarding identifier.

In some examples, the first edge node may send the probe packet to the second edge node. In some examples, the probe packet may utilize the particular route path from the first edge node to the second edge node, based at least in part on the second header that includes the local forwarding identifier associated with the first edge node.

In some examples, the first edge node may receive the probe packet from the second edge node. In some examples, the second edge device may decapsulate the probe packet such that the second header including the local forwarding identifier is removed from the probe packet, and the first header include the remote forwarding identifier remains. In some examples, the probe packet may utilize the particular route path from the second edge node to the first edge node based at least in part on the first header that includes the remote forwarding identifier associated with the second edge node.

In some examples, the first edge node may identify network performance information associated with the particular route path. For example, the first edge node may utilize the data included in the second probe packet to measure network performance associated with the particular route path, such as, for example, network jitter, network loss, and/or network latency. Additionally, or alternatively, the first edge node may store the network performance in the first virtual memory. Additionally, or alternatively, the first edge node may send data indicating the network performance to the network controller.

Additionally, or alternatively, the first edge node may utilize any of the techniques described above to generate multiple probe packets specifying the same forwarding route path and separate return route paths. For example, the first edge node may generate a first probe packet having a first outer header that includes a local forwarding identifier indicating a first route path of multiple route paths usable to send data from the first edge node to the second edge node, and a first inner header that includes a first remote forwarding identifier indicating the first route path usable to send data from the second edge node to the first edge node. Additionally, or alternatively, the first edge node may generate a second probe packet having a second outer header that includes the local forwarding identifier indicating the first route path, and a second inner header that includes a second remote forwarding identifier indicating a second route path of the multiple route paths usable to send data from the second edge node to the first edge node. In some examples, the first edge node may send the first probe packet and the second probe packet to the second edge node utilizing the first route path specified by the local forwarding identifier. Additionally, or alternatively, the first edge node may receive the first probe packet from the second edge node utilizing the first route path specified by the first remote forwarding identifier. Additionally, or alternatively, the first edge node may receive the second probe packet from the second edge node utilizing the second route path specified by the second remote forwarding identifier. In some examples, the first edge node may identify network performance information associated with the first route path and/or the second route path.

As described herein, a node can generally include any type of computing resource with at least one memory and/or processor. Further, although the techniques described as being implemented in a multi-site cloud computing network, the techniques are generally applicable for any network of devices managed by any entity where computing resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to performance measurement over different WAN circuits of a multi-site cloud computing network. For instance, the techniques described herein may provide edge nodes with local and remote discriminators and/or forwarding identifiers for generating a probe packet with a guaranteed forward and return path to consistently measure a two-way round-trip time of a route path between two edge nodes. By maintaining a database of local and remote discriminators and/or forwarding identifiers at each respective edge node, each edge node in the network may generate probe packets configured to measure network performance between the respective local edge node and any other remote edge node in the network. Additionally, utilizing two separate probe packets with the multi-path techniques described above, network performance of separate return paths that utilize different circuits (i.e., an MPLS circuit, an internet circuit, a path utilizing a segment routed circuit, a path utilizing a pseudowire circuit, and/or a 5G/LTE circuit) may be measured.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram 100 of an example flow for measuring network performance information associated with various route paths in a cloud computing network 102. The cloud computing network 102 comprise one or more data centers across Wide Area Network(s) (WAN) 104, and/or one or more sites included in the cloud computing network 102, such as, for example, Site A 106(1) and/or Site B 106(2). In some examples, the one or more sites 106 may include various networking components, such as, for example, edge node A 108(1) and/or edge node B108(2). Additionally, or alternatively, the WAN 104 may include various networking components, such as, for example, intermediate nodes 110(1)-(N), where N is any integer greater than 1. Additionally, or alternatively, the cloud computing network 102 may include a network controller. In some examples, the one or more network site(s) 106 and the WAN 104 may be located across geographic areas, and the cloud computing network 102 may be a distributed network through which users (often customers) may interact via user devices to manage or otherwise interact with service provided by the cloud computing network 102.

The cloud computing network 102 may provide on-demand availability of computing system resources of physical server(s) 114, such as data storage, computing power (e.g., CPU, GPU, etc.), networking, databases, etc., without direct active management by users. In some examples, the cloud computing network 102 may be managed and maintained by a service provider such that users do not have to invest in and maintain the computing infrastructure for their computing resource needs. Generally, a user may be provided access to, or allocated use of, a portion of the computing resources of physical server(s) 114 in the cloud computing network 102. The cloud computing network 102 may scale, such as by spinning up resources or spinning down resources, based on demand for the individual users. The portions of the cloud computing network 102 may be allocated using hardware virtualization such that portions of the cloud computing network 102 can be configured and managed by the user (e.g., security configuration, load balancing configuration, etc.). However, the cloud computing network 102 need not be managed by a service provider, and can be managed by any entity, including the user themselves that run the applications or services. In some examples, physical server(s) 114 may host one or more virtual machines. Each virtual machine may be configured to execute one of various operations and act as one or more virtual components for the cloud computing network 102.

In some examples, a virtual machine may be configured to execute one of various operations and act as an edge node 108 for a site 106 in the cloud computing network 102. In some examples, edge node A 108(1) may be disposed in site A 108(1) of the cloud computing network 102 and may include a virtual memory allocated for storing data such as site A discriminators 116(1). In some examples, the site A discriminators 116(1) may include a mapping of local discriminators that are associated with site A 106(1) and/or remote discriminators that are associated with site B 106(2). Additionally, or alternatively, edge node B 108(2) may be disposed in a site B 108(2) of the cloud computing network 102 and may include a virtual memory allocated for storing data such as site B discriminators 116(2). In some examples, the site B discriminators 116(1) may include a mapping of local discriminators that are associated with site B 106(2) and/or remote discriminators that are associated with site A 106(1).

Generally, the number of network sites 106, edge nodes 108, and/or other computing resources associated with the cloud computing network 102 may scale based on a number of users 118 interacting with the cloud computing network. The users 118 may comprise one or more of individual users, groups of users, organizations, businesses, or other entities that interact with the cloud computing network 102 via respective user devices. The user devices may be any type of computing device capable of connecting to the cloud computing network 102 via a suitable data communications network 120 such as, but not limited to, a laptop or desktop computer, a tablet computing device, a server computer, a television, or a mobile telephone. Administrative users employed by the operator of the cloud computing network 102, such as administrators managing the operation of the cloud computing network 102, might also connect with, manage, and utilize resources provided by the service provider network 102 in a similar fashion.

The users 118 may provide input data 122 via the network(s) 120 to interact with the service that is supported by the computing resources running on the servers 114. For example, the users 118 may submit requests to process data, retrieve data, store data, and so forth such that virtual machines hosting computing resources are spun up or spun down to process the requests based on demand. Additionally, or alternatively, the users 118 may be an administrative user 118 that may provide input data 122 via the network(s) 120 to interact with the multi-site cloud computing network 102 and add and/or remove networking device. For example, the administrative users 118 may submit requests to add a site 106 and/or a network switch, such as, for example, an edge node 108 and/or an intermediate node 110.

In some examples, edge node A 108(1) disposed in site A 106(1) of the cloud computing network 102 may generate a probe packet to send through the WAN 104 to edge node B 108(2) disposed in site B 106(2) of the cloud computing network 102. The probe packet may be utilized to gather data and measure the network performance associated with a route between edge node A 108(1) and edge node B 108(2). For example, the probe packet may be utilized to measure network latency associated with a particular route path, network packet loss associated with a particular route path, and/or network jitter associated with a particular route path. In some examples, edge node A 108(1) may generate a probe packet that includes a data portion and an indication of a local discriminator and a remote discriminator. Edge node A 108(1) may identify the local discriminator and/or remote discriminator in the database of site A discriminators 116(1) stored in virtual memory. Edge node A 108(1) may then send the probe packet through the WAN 104 to edge node B 108(2) in site B 106(2). The probe packet may utilize the local discriminator to select the desired route path through the WAN 104. When the probe packet is received at edge node B 108(2) in site B 106(2), edge node B 108(2) may utilize the remote discriminator to identify the desired route having a corresponding local discriminator in the database of site B discriminators 108(2) stored in virtual memory. Edge node B 108(2) may then generate a response probe packet including a local discriminator and a remote discriminator and send the response probe packet through the WAN 104 to edge node A 108(1) in site A 106(1). Edge node A 108(1) may then compare the local discriminator included in the probe packet with the remote discriminator included in the response probe packet, and if there is a match, edge node A 108(1) knows that the probe packet was forwarded and returned through the desired route path. Edge node A 108(1) may then identify the network performance information associated with the desired route path and may store the information in association with the route path. Additionally, or alternatively, edge node A 108(1) may transmit the network performance information to the network controller 112 where it may be stored in a memory associated with the network controller 112.

At "1," edge node A 108(1) disposed in site A 106(1) included in a multi-site cloud computing network 102 may identify a first local discriminator indicating a particular route path of multiple route paths that are usable to send data from edge node A 108(1) to edge node B 108(2) disposed in site B 106(2) of the multi-site cloud computing network 102. In some examples, edge node A 108(1) may assign the local discriminators to the multiple route paths, and the local discriminators may be stored in a database of site A discriminators 116(1) associated with edge node A 108(1). Additionally, or alternatively, the network controller 112 may assign the local discriminators to the multiple route paths that are usable to send data from edge node A 108(1) to edge node B 108(2) and send an indication of the local discriminators to edge node A 108(1).

At "2," edge node A 108(1) may identify a first remote discriminator indicating the particular route path from edge node B 108(2) to edge node A 108(1). In some examples, edge node A 108(1) may access the database of site A discriminators to identify the first remote discriminator. In some examples, the network controller 112 may assign the remote discriminators to the multiple route paths that are usable to send data from edge node B 108(2) to edge node A 108(1) and send an indication of the remote discriminators to edge node A 108(1).

At "3," edge node A 108(1) may then generate a first probe packet including the first local discriminator and the first remote discriminator. In some examples, the first probe packet may include a data portion for transmitting data and/or utilized to collect and store data measuring network performance associated with the particular route. Additionally, or alternatively, the first probe packet may include a portion for specifying the first local discriminator and the first remote discriminator.

At "4," edge node A 108(1) may then send the first probe packet through the particular route path through the WAN 104 to edge node B 108(2). For example, edge node A 108(1) may utilize the first local discriminator to identify the particular route path and send the first probe packet through the particular route path.

At "5," edge node A 108(1) may receive a second probe packet from edge node B 108(2). For example, edge node B 108(2) may identify, in second virtual memory associated with the edge node B 108(2), a second local discriminator corresponding to the first remote discriminator, and a second remote discriminator corresponding to the first local discriminator included in the first probe packet. Additionally, or alternatively, edge node B 108(2) may generate a second probe packet including the second local discriminator associated with the particular route path and the second remote discriminator associated with the particular route path. In some examples, the second local discriminator may correspond to the first remote discriminator. Additionally, or alternatively, the second remote discriminator may correspond to the first local discriminator.

At "6," edge node A 108(1) may verify that the second probe packet utilized the particular route path from the edge node B 108(1). For example, edge node A 108(1) may determine that the first local discriminator is equal to the second remote discriminator. Additionally, or alternatively, edge node A 108(1) may determine that the first remote discriminator is equal to the second local discriminator.

At "7," edge node A 108(1) may identify network performance information associated with the particular route path. For example, edge node A 108(1) may utilize the data included in the second probe packet to measure network performance associated with the particular route path, such as, for example, network jitter, network packet loss, and/or network latency. Additionally, or alternatively, edge node A 108(1) may store the network performance information in virtual memory associated with edge node A 108(1). Additionally, or alternatively, edge node A 108(1) may send data indicating the network performance information to the network controller 112.

Figure 1B:
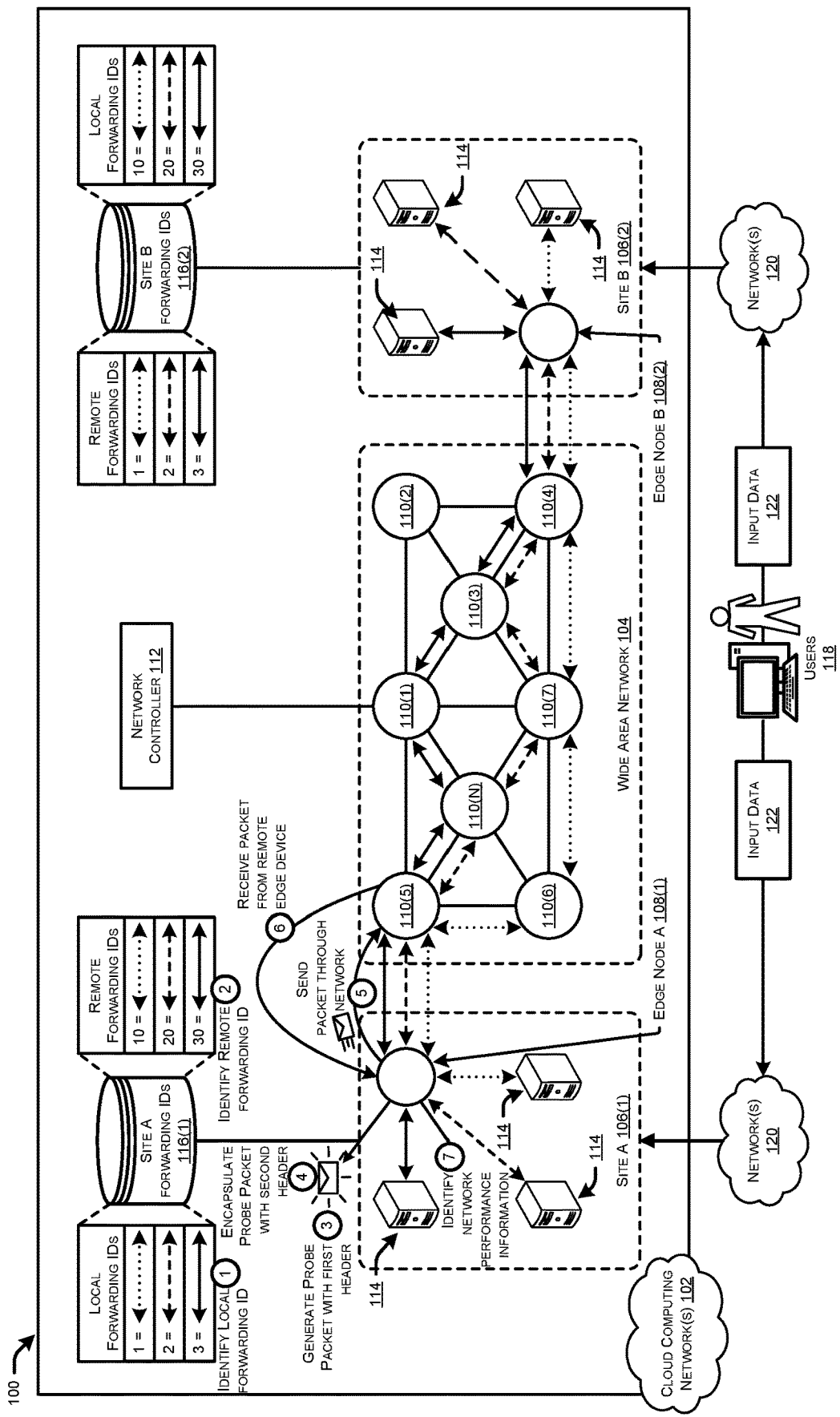
FIG. 1B illustrates a system-architecture diagram of an example flow for a local edge node to identify local and remote forwarding identifiers to generate a probe packet having an inner header including the remote forwarding identifier and encapsulate the probe packet with an outer header include the local forwarding identifier so that the packet is forwarded to a remote edge node through a specified route path and returned through a specified route to measure network performance associated with the specified network route path.

FIG. 1B illustrates a system-architecture diagram 200 of an example flow for edge node A 108(1) in a site A 106(1) of a multi-site cloud computing network 102 to utilize a probe packet forwarded through a WAN 104 to site B 106(2) of the multi-site cloud computing network 102 and returned through the same route path to measure network performance associated with the route path.

In some examples, edge node A 108(1) may identify local and remote forwarding identifiers to generate a probe packet having an inner header including the remote forwarding identifier and encapsulate the probe packet with an outer header including the local forwarding identifier so that the packet is forwarded to edge node B 108(2) through a particular route path through the WAN 104 and returned through the specified route path through the WAN to measure network performance associated with the particular route path.

For example, edge node A 108(1) disposed in site A 106(1) of the cloud computing network 102 may generate a probe packet to send through the WAN 104 to edge node B 108(2) disposed in site B 106(2) of the cloud computing network 102. The probe packet may be utilized to gather data and measure the network performance associated with a route between edge node A 108(1) and edge node B 108(2). For example, the probe packet may be utilized to measure network latency associated with a particular route path, network packet loss associated with a particular route path, and/or network jitter associated with a particular route path. In some examples, edge node A 108(1) may generate a probe packet that includes a data portion, an inner header including a remote forwarding identifier, and an outer header including a local forwarding identifier. Edge node A 108(1) may identify a local forwarding identifier and/or remote forwarding identifier in the database of site A forwarding identifiers 116(1) stored in virtual memory. Edge node A 108(1) may then send the probe packet through the WAN 104 to edge node B 108(2) in site B 106(2). The probe packet may utilize the particular route path from edge node A 108(1) to edge node B 108(2) based on the outer header that includes the local forwarding identifier associated with edge node A 108(1). When the probe packet is received at edge node B 108(2) in site B 106(2), edge node B 108(2) may decapsulate the probe packet such that the outer header including the local forwarding identifier is removed from the probe packet, and the inner header including the remote forwarding identifier remains. Edge node B 108(2) may then send the probe packet through the WAN 104 to edge node A 108(1) in site A 106(1). The probe packet may utilize the particular route path from edge node B 108(2) to edge node A 108(1) based on the inner header that includes the remote forwarding identifier associated with edge node B 108(2). Edge node A 108(1) may then identify the network performance information associated with the particular route path and may store the information in association with the route path. Additionally, or alternatively, edge node A 108(1) may transmit the network performance information to the network controller 112 where it may be stored in a memory associated with the network controller 112.

At "1," edge node A 108(1) disposed in site A 106(1) included in a multi-site cloud computing network 102 may identify a local forwarding identifier associated with edge node A 108(1). In some examples, the local forwarding identifier may indicate a particular route path of multiple route paths usable to send data from edge node A 108(1) to edge node B 108(2) disposed in site B 106(2) of the multi-site cloud computing network 102. In some examples, the local forwarding identifier may be stored in a database of site A forwarding identifiers 116(1) associated with edge node A 108(1). Additionally, or alternatively, the network controller 112 may send an indication of the local forwarding identifiers associated with the multiple paths to edge node A 108(1).

At "2," edge node A 108(1) may identify a remote forwarding identifier associated with edge node B 108(2). In some examples, the remote forwarding identifier may indicate the particular route path from edge node B 108(2) to edge node A 108(1). In some examples, the remote forwarding identifier may be stored in a database of site A forwarding identifiers 116(1) associated with edge node A 108(1). Additionally, or alternatively, the network controller 112 may send an indication of the remote forwarding identifiers, associated with the multiple paths, to edge node A 108(1).

At "3," edge node A 108(1) may then generate a probe packet having a first header that includes the remote forwarding identifier. In some examples, the first probe packet may include a data portion for transmitting data and/or utilized to collect and store data measuring network performance associated with the particular route.

At "4," edge node A 108(1) may then encapsulate the probe packet with a second header that includes the local forwarding identifier. In some examples, the first header may be configured as an inner header, and the second header may be configured as an outer header, such that the probe packet is configured to utilize the route path specified by the forwarding identifier included in the outer header.

At "5," edge node A 108(1) may send the probe packet through the particular route path through the WAN 104 to edge node B 108(2). For example, the probe packet may be configured to utilize the particular route path specified by the forwarding identifier included in the second header. In some examples, when the probe packet is received at edge node B 108(2) in site B 106(2), edge node B 108(2) may decapsulate the probe packet such that the second header including the local forwarding identifier is removed from the probe packet, and the first header including the remote forwarding identifier remains.

At "6," edge node A 108(1) may receive the probe packet from edge node B 102(2). In some examples, edge node B 108(2) may send the probe packet through the WAN 104 to edge node A 108(1) in site A 106(1). The probe packet may utilize the particular route path from edge node B 108(2) to edge node A 108(1) based on the first header that includes the remote forwarding identifier associated with edge node B 108(2).

At "7," edge node A 108(1) may identify network performance information associated with the particular route path. For example, edge node A 108(1) may utilize the data included in the second probe packet to measure network performance associated with the particular route path, such as, for example, network jitter, network packet loss, and/or network latency. Additionally, or alternatively, edge node A 108(1) may store the network performance information in virtual memory associated with edge node A 108(1). Additionally, or alternatively, edge node A 108(1) may send data indicating the network performance information to the network controller 112.

Figure 2A:
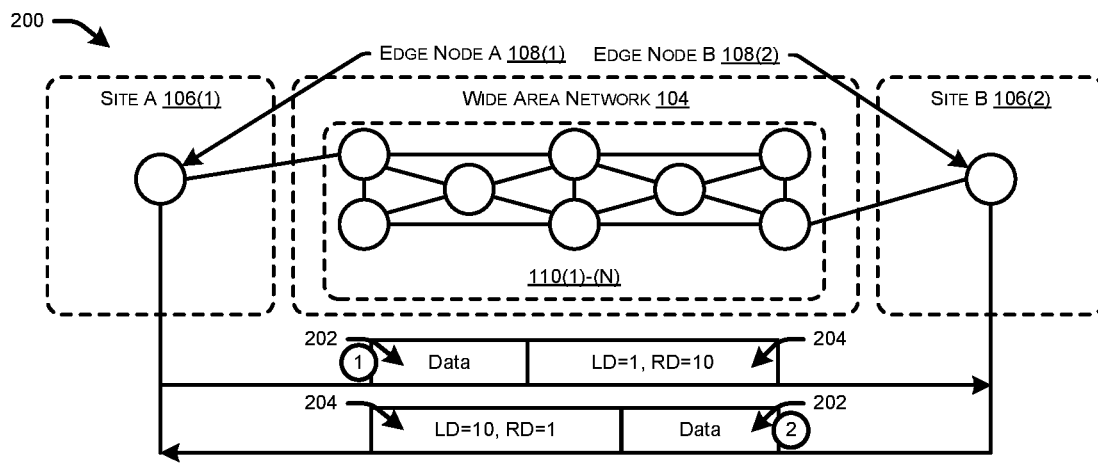
FIG. 2A illustrates a diagram of an example flow for forwarding and returning a probe packet through an example wide area network by utilizing local and remote route discriminators.

FIG. 2A illustrates a diagram 200 of an example flow for forwarding and returning a probe packet through an example WAN 104 of a cloud computing network 102 by utilizing local and remote discriminators.

As described above with respect to FIGS. 1A and 1B, a first edge node 108(1) disposed in a first site 106(1) of a multi-site cloud computing network 102 may send a probe packet through a WAN 104 to a second edge node 108(2) disposed in a second site 106(2) of the multi-site cloud computing network 102. The first edge node 108(1) may receive a return probe packet from the second edge node 108(2) and use data included in the return probe packet to measure network performance associated with the route path through which the probe packet utilized through the WAN 104 between the first edge node 108(1) and the second edge node 108(2).

In some examples, the probe packet may include a first portion 202 for transmitting data and/or a second portion 204 for specifying a local discriminator and/or a remote discriminator. The first portion 202 may be utilized to transmit data between edge nodes 108(1), 108(2). Additionally, or alternatively, the first portion 202 may be utilized to collect the network performance information associated with the particular route path through which the probe packet utilized through the WAN 104 between the first edge node 108(1) and the second edge node 108(2). In some examples, the network performance information may include various network performance measurables such as, for example, network jitter, network packet loss, and/or network latency associated with the particular route path.

At "1," a first probe packet may be sent from the first edge node 108(1) disposed in site A 106(1) through the WAN 104 to the second edge node 108(2) disposed in site B 106(2). The first probe packet may utilize the particular route path through the WAN 104 that is specified by the first local discriminator ("LD=1") included in the second portion 204 of the first probe packet.

At "2," a second probe packet may be sent from the second edge node 108(2) disposed in site B 106(2) through the WAN 104 to the first edge node 108(1) disposed in site A 106(1). The second probe packet may utilize the particular route path through the WAN 104 that is specified by the second local discriminator ("LD=10") included in the second portion 204 of the second probe packet.

Figure 2B:
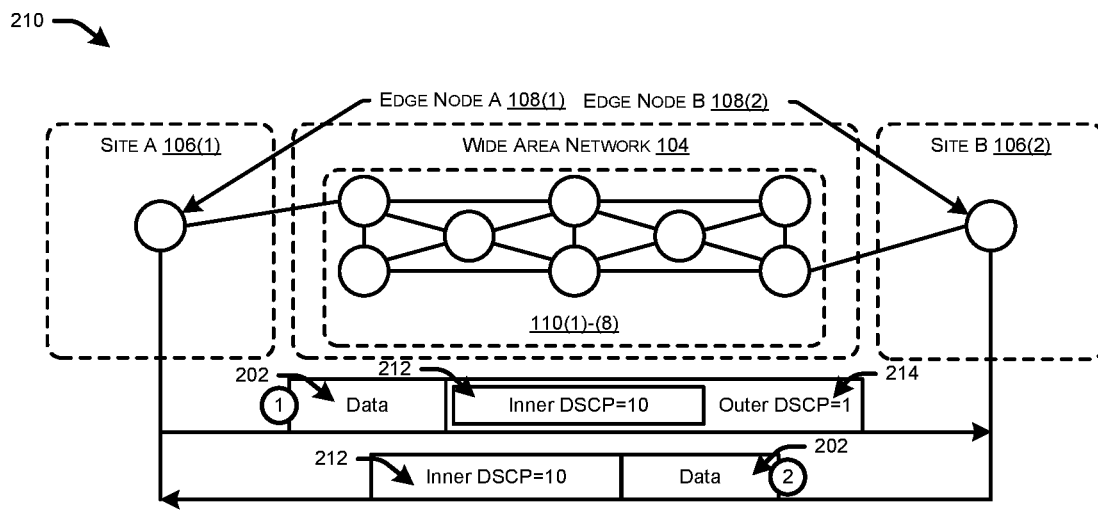
FIG. 2B illustrates a diagram of an example flow for forwarding and returning a probe packet through an example wide area network by utilizing local and remote forwarding identifiers as an outer header an encapsulated inner header, respectively.

FIG. 2B illustrates a diagram 210 of an example flow for forwarding and returning a probe packet through an example WAN 104 of a cloud computing network 102 by utilizing local and remote forwarding identifiers as an outer header an encapsulated inner header, respectively.

In some examples, the probe packet may include a first portion 202 for transmitting data, an inner header 212 including a remote forwarding identifier, and/or an outer header 214 including a local forwarding identifier. The first portion 202 may be utilized to transmit data between edge nodes 108(1), 108(2). Additionally, or alternatively, the first portion 202 may be utilized to collect the network performance information associated with the particular route path through which the probe packet utilized through the WAN 104 between the first edge node 108(1) and the second edge node 108(2). In some examples, the network performance information may include various network performance measurables such as, for example, network jitter, network packet loss, and/or network latency associated with the particular route path. Additionally, or alternatively, the local forwarding identifier and/or remote forwarding identifier may be configured as at least one of a differentiated services code point (DSCP) value or a segment routing segment identifier (SR SID).

At "1," a probe packet may be sent from the first edge node 108(1) disposed in site A 106(1) through the WAN 104 to the second edge node 108(2) disposed in site B 106(2). The probe packet may utilize the particular route path through the WAN 104 that is specified by the local forwarding identifier ("DSCP=1") included in the outer header 214 of the probe packet.

At "2," the probe packet may be sent from the second edge node 108(2) disposed in site B 106(2) through the WAN 104 to the first edge node 108(1) disposed in site A 106(1). The probe packet may utilize the particular route path through the WAN 104 that is specified by the remote forwarding identifier ("DSCP=10") included in the inner header 212 of the probe packet.

Figure 2C:
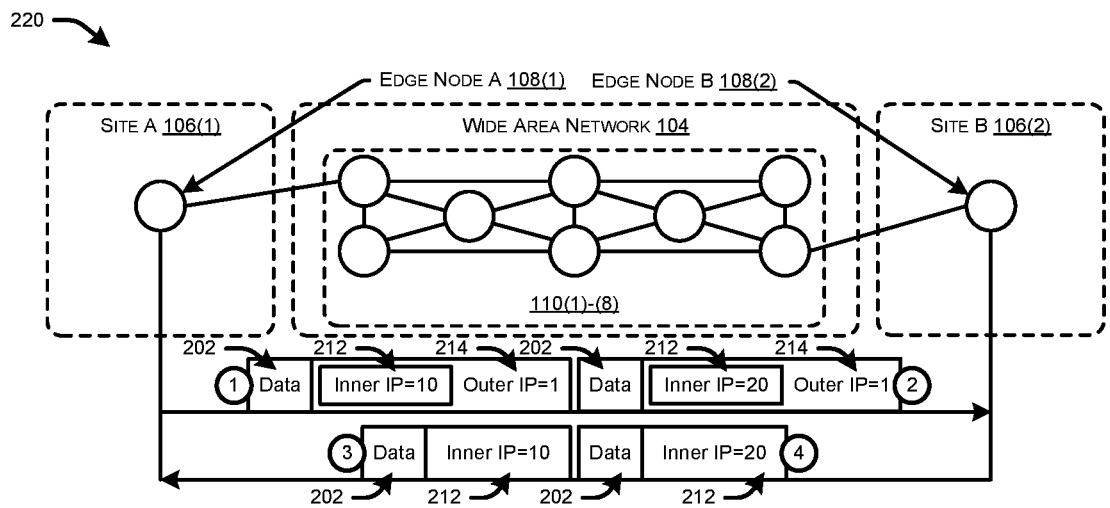
FIG. 2C illustrates an example flow for forwarding and returning two probe packets from a local edge node using an outer header specifying the same forwarding path to a remote edge node and respective inner headers specifying differing return paths from the remote edge node.

FIG. 2C illustrates a diagram 220 of an example flow for forwarding and returning two probe packets from a local edge node 108(1) using an outer header specifying the same forwarding path through an example WAN 104 of a cloud computing network 102 to a remote edge node 108(2) and respective inner headers specifying differing return paths from the remote edge node 108(2).

In some examples, the probe packets may include a first portion 202 for transmitting data, an inner header 212 including a remote forwarding identifier, and/or an outer header 214 including a local forwarding identifier. The first portion 202 may be utilized to transmit data between edge nodes 108(1), 108(2). Additionally, or alternatively, the first portion 202 may be utilized to collect the network performance information associated with the particular route path through which the probe packet utilized through the WAN 104 between the first edge node 108(1) and the second edge node 108(2). In some examples, the network performance information may include various network performance measurables such as, for example, network jitter, network packet loss, and/or network latency associated with the particular route path. Additionally, or alternatively, the local forwarding identifier and/or remote forwarding identifier may be configured as at least one of a differentiated services code point (DSCP) value or a segment routing segment identifier (SR SID). The edge nodes 108 may send two probe packets with an outer header 214 including a shared local forwarding identifier ("IP=1") and respective inner headers 212 including differing remote forwarding identifiers ("IP=10," and "IP=20").

At "1," a first probe packet may be sent from the first edge node 108(1) disposed in site A 106(1) through the WAN 104 to the second edge node 108(2) disposed in site B 106(2). The probe packet may utilize the particular route path through the WAN 104 that is specified by the local forwarding identifier ("IP=1") included in the outer header 214 of the probe packet.

At "2," a second probe packet may be sent from the first edge node 108(1) disposed in site A 106(1) through the WAN 104 to the second edge node 108(2) disposed in site B 106(2). The probe packet may utilize the particular route path through the WAN 104 that is specified by the local forwarding identifier ("IP=1") included in the outer header 214 of the probe packet.

At "3," the first probe packet may be sent from the second edge node 108(2) disposed in site B 106(2) through the WAN 104 to the first edge node 108(1) disposed in site A 106(1). The probe packet may utilize the particular route path through the WAN 104 that is specified by the first remote forwarding identifier ("IP=10") included in the inner header 212 of the probe packet.

At "4," the second probe packet may be sent from the second edge node 108(2) disposed in site B 106(2) through the WAN 104 to the first edge node 108(1) disposed in site A 106(1). The probe packet may utilize the particular route path through the WAN 104 that is specified by the second remote forwarding identifier ("IP=20") included in the inner header 212 of the probe packet.

Figure 3:
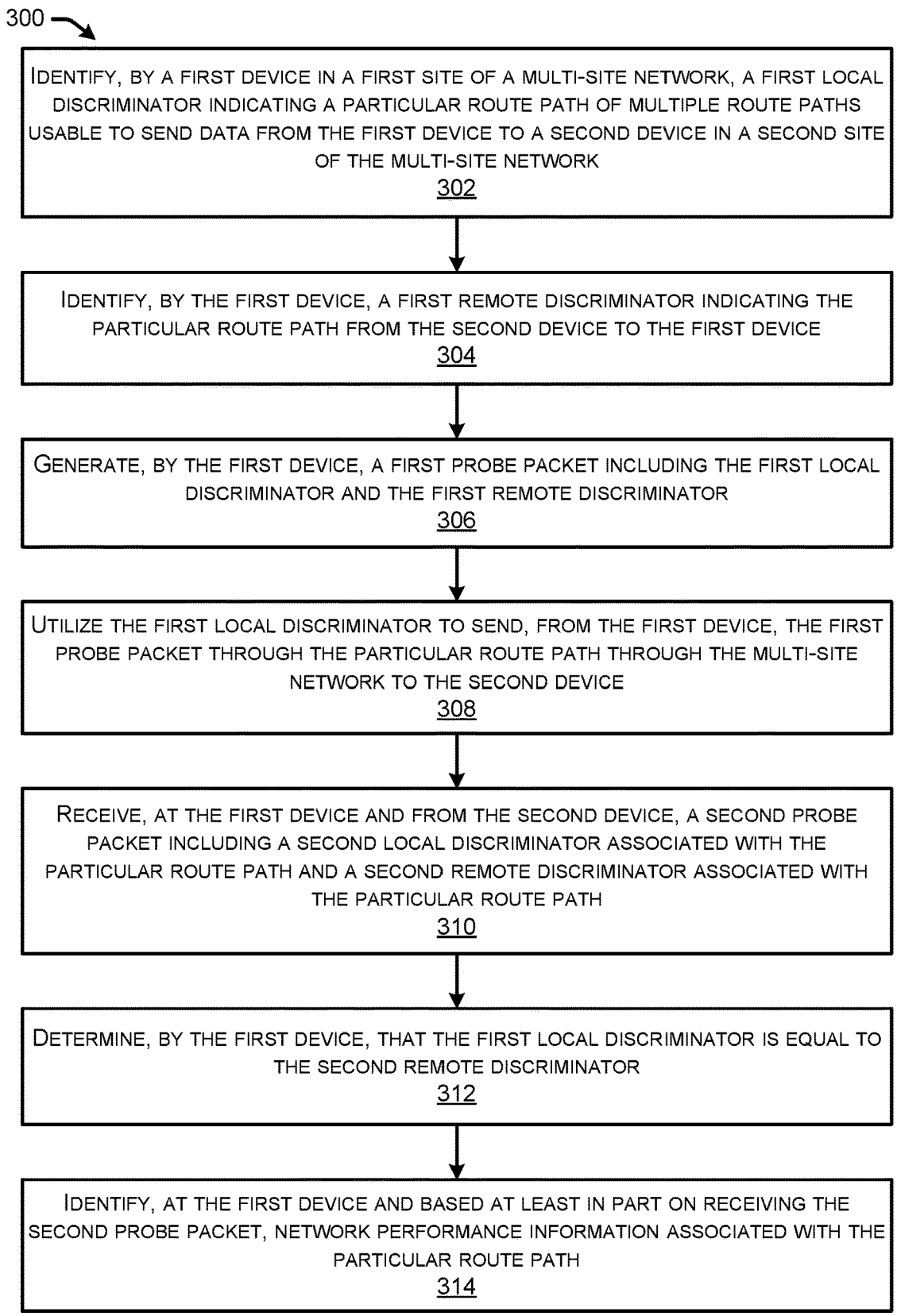
FIG. 3 illustrates a flow diagram of an example method for a local edge node to identify local and remote route discriminators to generate a probe packet, configured to forward to a remote edge node and return on a route specified by the discriminators, and measure network performance of the specified network route path.
Figure 4:
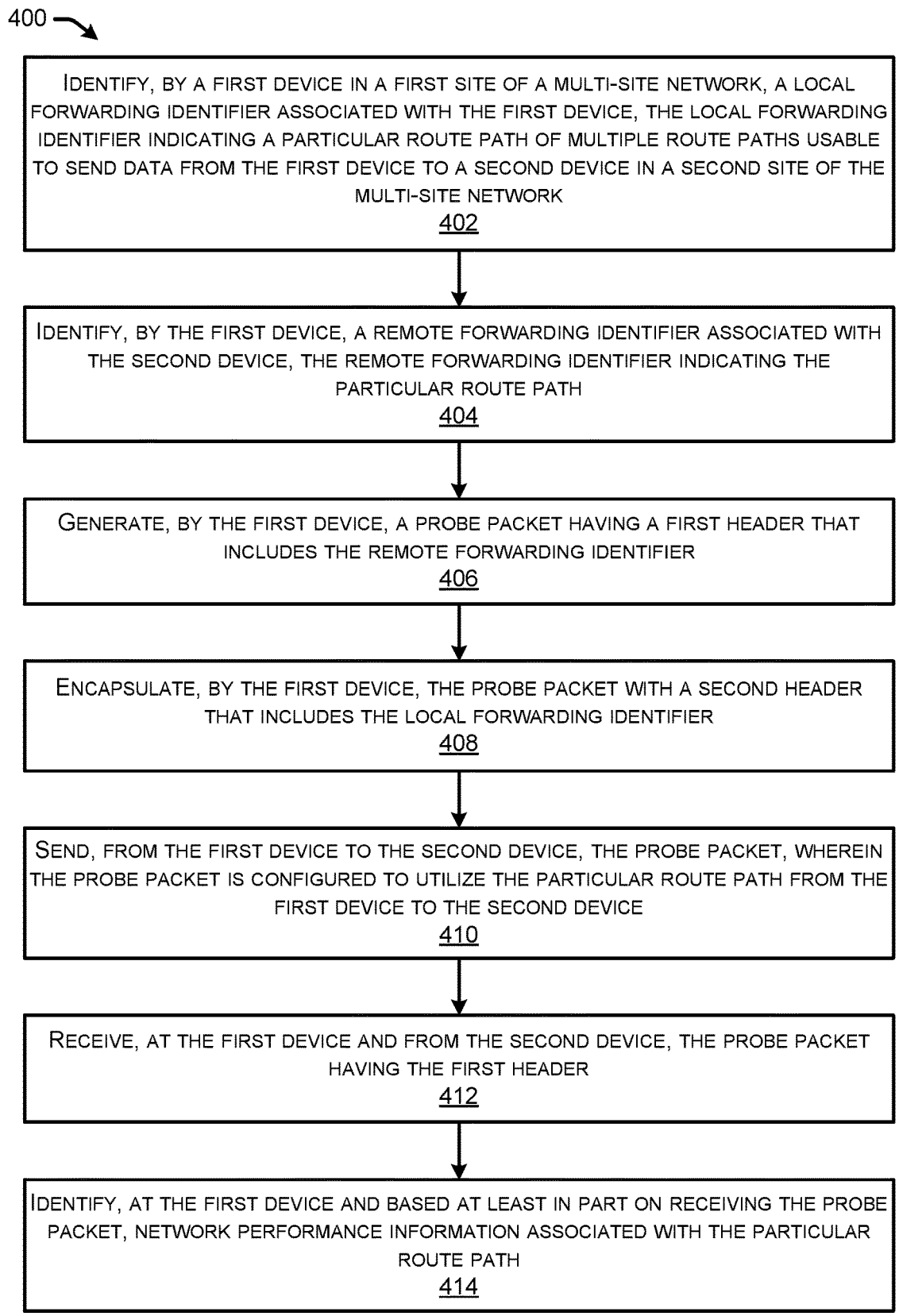
FIG. 4 illustrates a flow diagram of an example method for a local edge node to identify local and remote forwarding identifiers to generate a probe packet having an inner header including the remote forwarding identifier and encapsulate the probe packet with an outer header include the local forwarding identifier so that the packet is forwarded to a remote edge node and returned on a specified route to measure network performance of the specified network route path.
Figure 5:
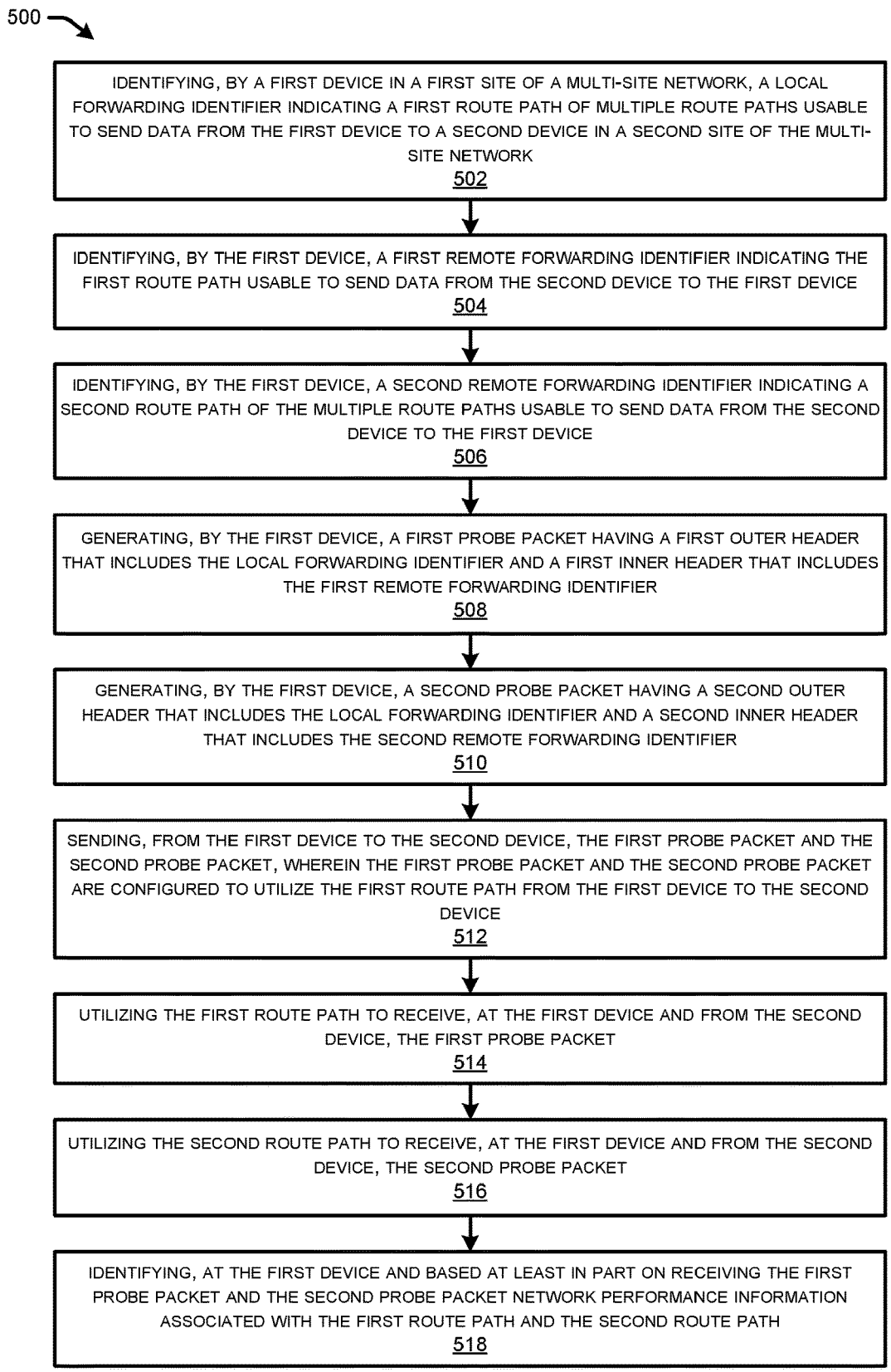
FIG. 5 illustrates a flow diagram of an example method for a local edge node to identify local and remote discriminators and/or forwarding identifiers to generate two probe packets having respective inner headers specifying differing return paths from a remote edge node and encapsulate the probe packet with a shared outer header so that the packet is forwarded to a remote edge node on a shared route and returned on specified differing routes to measure network performance of the separate route paths.

FIGS. 3-5 illustrate flow diagrams of example methods 300, 400, and 500 and that illustrate aspects of the functions performed at least partly by the cloud computing network 102 as described in FIGS. 1A-2. The logical operations described herein with respect to FIGS. 3-5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3-5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a first edge node 108(1) to identify local and remote route discriminators to generate a probe packet, configured to forward to a second edge node 108(2) and return on a route specified by the discriminators, and measure network performance of the specified network route path through the WAN 104 in a cloud computing network 102.

At 302, a first edge node 108(1) disposed in a first site 106(1) included in a multi-site cloud computing network 102 may identify a first local discriminator indicating a particular route path of multiple route paths that are usable to send data to a second edge node 108(2) disposed in a second site 106(2) of the multi-site cloud computing network 102. In some examples, the first edge node 108(1) may assign the local discriminators to the multiple route paths, and the local discriminators may be stored in a database of first site discriminators 116(1) associated with the first edge node 108(1). Additionally, or alternatively, the network controller 112 may assign the local discriminators to the multiple route paths that are usable to send data from the first edge node 108(1) to the second edge node 108(2) and send an indication of the local discriminators to the first edge node 108(1).

At 304, the first edge node 108(1) may identify a first remote discriminator indicating the particular route path from the second edge node 108(2) to the first edge node 108(1). In some examples, the first edge node 108(1) may access the database of first site discriminators to identify the first remote discriminator. In some examples, the network controller 112 may assign the remote discriminators to the multiple route paths that are usable to send data from the second edge node 108(2) to the first edge node 108(1) and send an indication of the remote discriminators to the first edge node 108(1).

At 306, the first edge node 108(1) may then generate a first probe packet including the first local discriminator and the first remote discriminator. In some examples, the first probe packet may include a data portion for transmitting data and/or utilized to collect and store data measuring network performance associated with the particular route. Additionally, or alternatively, the first probe packet may include a portion for specifying the first local discriminator and the first remote discriminator.

At 308, the first edge node 108(1) may then send the first probe packet through the particular route path through the WAN 104 to the second edge node 108(2). For example, the first edge node 108(1) may utilize the first local discriminator to identify the particular route path and send the first probe packet through the particular route path.

At 310, the first edge node 108(1) may receive a second probe packet from the second edge node 108(2). For example, the second edge node 108(2) may identify, in second virtual memory associated with the second edge node 108(2), a second local discriminator corresponding to the first remote discriminator, and a second remote discriminator corresponding to the first local discriminator included in the first probe packet. Additionally, or alternatively, the second edge node 108(2) may generate a second probe packet including the second local discriminator associated with the particular route path and the second remote discriminator associated with the particular route path. In some examples, the second local discriminator may correspond to the first remote discriminator. Additionally, or alternatively, the second remote discriminator may correspond to the first local discriminator.

At 312, the first edge node 108(1) may verify that the second probe packet utilized the particular route path from the first edge node 108(1). For example, the first edge node 108(1) may determine that the first local discriminator is equal to the second remote discriminator. Additionally, or alternatively, the first edge node 108(1) may determine that the first remote discriminator is equal to the second local discriminator.

At 314, the first edge node 108(1) may identify network performance information associated with the particular route path. For example, the first edge node 108(1) may utilize the data included in the second probe packet to measure network performance associated with the particular route path, such as, for example, network jitter, network packet loss, and/or network latency. Additionally, or alternatively, the first edge node 108(1) may store the network performance information in virtual memory associated with the first edge node 108(1). Additionally, or alternatively, the first edge node 108(1) may send data indicating the network performance information to the network controller 112.

FIG. 4 illustrates a flow diagram of an example method 400 for a first edge node 108(1) to identify local and remote forwarding identifiers to generate a probe packet having an inner header including the remote forwarding identifier and encapsulate the probe packet with an outer header include the local forwarding identifier so that the packet is forwarded to a second edge node 108(2) and returned on a specified route to measure network performance of the specified network route path through the WAN 104 in the cloud computing network 102.

At 402, the first edge node 108(1) disposed in a first site 106(1) included in a multi-site cloud computing network 102 may identify a local forwarding identifier associated with the first edge node 108(1). In some examples, the local forwarding identifier may indicate a particular route path of multiple route paths usable to send data from the first edge node 108(1) to a second edge node 108(2) disposed in a second site 106(2) of the multi-site cloud computing network 102. In some examples, the local forwarding identifier may be stored in a database of first site forwarding identifiers 116(1) associated with the first edge node 108(1). Additionally, or alternatively, the network controller 112 may send an indication of the local forwarding identifiers associated with the multiple paths to the first edge node 108(1).

At 404, the first edge node 108(1) may identify a remote forwarding identifier associated with the second edge node 108(2). In some examples, the remote forwarding identifier may indicate the particular route path from the second edge node 108(2) to the first edge node 108(1). In some examples, the remote forwarding identifier may be stored in a database of site A forwarding identifiers 116(1) associated with the first edge node 108(1). Additionally, or alternatively, the network controller 112 may send an indication of the remote forwarding identifiers, associated with the multiple paths, to the first edge node 108(1).

At 406, the first edge node 108(1) may then generate a probe packet having a first header that includes the remote forwarding identifier. In some examples, the first probe packet may include a data portion for transmitting data and/or utilized to collect and store data measuring network performance associated with the particular route.

At 408, the first edge node 108(1) may then encapsulate the probe packet with a second header that includes the local forwarding identifier. In some examples, the first header may be configured as an inner header, and the second header may be configured as an outer header, such that the probe packet is configured to utilize the route path specified by the forwarding identifier included in the outer header.

At 410, the first edge node 108(1) may send the probe packet through the particular route path through the WAN 104 to the second edge node 108(2). For example, the probe packet may be configured to utilize the particular route path specified by the forwarding identifier included in the second header. In some examples, when the probe packet is received at the second edge node 108(2) in a second site 106(2), the second edge node 108(2) may decapsulate the probe packet such that the second header including the local forwarding identifier is removed from the probe packet, and the first header including the remote forwarding identifier remains.

At 412, the first edge node 108(1) may receive the probe packet from the second edge node 102(2). In some examples, the second edge node 108(2) may send the probe packet through the WAN 104 to the first edge node 108(1) in the first site 106(1). The probe packet may utilize the particular route path from the second edge node 108(2) to the first edge node 108(1) based on the first header that includes the remote forwarding identifier associated with the second edge node 108(2).

At 414, the first edge node 108(1) may identify network performance information associated with the particular route path. For example, the first edge node 108(1) may utilize the data included in the probe packet to measure network performance associated with the particular route path, such as, for example, network jitter, network packet loss, and/or network latency. Additionally, or alternatively, the first edge node 108(1) may store the network performance information in virtual memory associated with the first edge node 108(1). Additionally, or alternatively, the first edge node 108(1) may send data indicating the network performance information to the network controller 112.

FIG. 5 illustrates a flow diagram of an example method 500 for a first edge node 108(1) to identify local and remote discriminators and/or forwarding identifiers to generate two probe packets having respective inner headers specifying differing return paths from a second edge node 108(2) and encapsulate the probe packet with a shared outer header so that the packet is forwarded to a second edge node 108(2) on a shared route and returned on specified differing routes to measure network performance of the separate route paths through the WAN 104 in the cloud computing network 102.

At 502, the first edge node 108(1) disposed in a first site 106(1) included in a multi-site cloud computing network 102 may identify a local forwarding identifier associated with the first edge node 108(1). In some examples, the local forwarding identifier may indicate a first route path of multiple route paths usable to send data from the first edge node 108(1) to a second edge node 108(2) disposed in a second site 106(2) of the multi-site cloud computing network 102. In some examples, the local forwarding identifier may be stored in a database of first site forwarding identifiers 116(1) associated with the first edge node 108(1). Additionally, or alternatively, the network controller 112 may send an indication of the local forwarding identifiers associated with the multiple paths to the first edge node 108(1).

At 504, the first edge node 108(1) may identify a first remote forwarding identifier associated with the second edge node 108(2). In some examples, the first remote forwarding identifier may indicate the first route path usable to send data from the second edge node 108(2) to the first edge node 108(1). In some examples, the first remote forwarding identifier may be stored in a database of site A forwarding identifiers 116(1) associated with the first edge node 108(1). Additionally, or alternatively, the network controller 112 may send an indication of the remote forwarding identifiers, associated with the multiple paths, to the first edge node 108(1).

At 506, the first edge node 108(1) may identify a second remote forwarding identifier associated with the second edge node 108(2). In some examples, the second remote forwarding identifier may indicate a second route path usable to send data from the second edge node 108(2) to the first edge node 108(1).

At 508, the first edge node 108(1) may generate a first probe packet having a first inner header that includes the first remote forwarding identifier and a first outer header that includes the local forwarding identifier. In some examples, the first probe packet may include a data portion for transmitting data and/or utilized to collect and store data measuring network performance associated with the particular route.

At 510, the first edge node 108(1) may generate a second probe packet having a second inner header that includes the second remote forwarding identifier and a second outer header that includes the local forwarding identifier. In some examples, the second probe packet may include a data portion for transmitting data and/or utilized to collect and store data measuring network performance associated with the particular route.

At 512, the first edge node 108(1) may send the first probe packet and the second packet through the first route path through the WAN 104 to the second edge node 108(2). For example, the first probe packet and/or the second probe packet may be configured to utilize the first route path specified by the local forwarding identifier included in the first outer header and/or the second outer header. In some examples, when the first probe packet and/or the second probe packet is received at the second edge node 108(2) in a second site 106(2), the second edge node 108(2) may decapsulate the first probe packet and/or the second probe packet such that the first outer header and/or the second outer header including the local forwarding identifier is removed from the first probe packet and/or the second probe packet, and the first inner header and/or the second inner header including the first remote forwarding identifier and/or the second remote forwarding identifier remains.

At 514, the first edge node 108(1) may receive the first probe packet from the second edge node 102(2). In some examples, the second edge node 108(2) may send the first probe packet through the WAN 104 to the first edge node 108(1) in the first site 106(1). The first probe packet may utilize the first route path from the second edge node 108(2) to the first edge node 108(1) based on the first inner header that includes the first remote forwarding identifier associated with the second edge node 108(2).

At 516, the first edge node 108(1) may receive the second probe packet from the second edge node 102(2). In some examples, the second edge node 108(2) may send the second probe packet through the WAN 104 to the first edge node 108(1) in the first site 106(1). The second probe packet may utilize the second route path from the second edge node 108(2) to the first edge node 108(1) based on the second inner header that includes the second remote forwarding identifier associated with the second edge node 108(2).

At 518, the first edge node 108(1) may identify network performance information associated with the first route path and/or the second route path. For example, the first edge node 108(1) may utilize the data included in the first and/or second probe packet to measure network performance associated with the first and/or second route path, such as, for example, network jitter, network packet loss, and/or network latency. Additionally, or alternatively, the first edge node 108(1) may store the network performance information in virtual memory associated with the first edge node 108(1). Additionally, or alternatively, the first edge node 108(1) may send data indicating the network performance information to the network controller 112.

Figure 6:
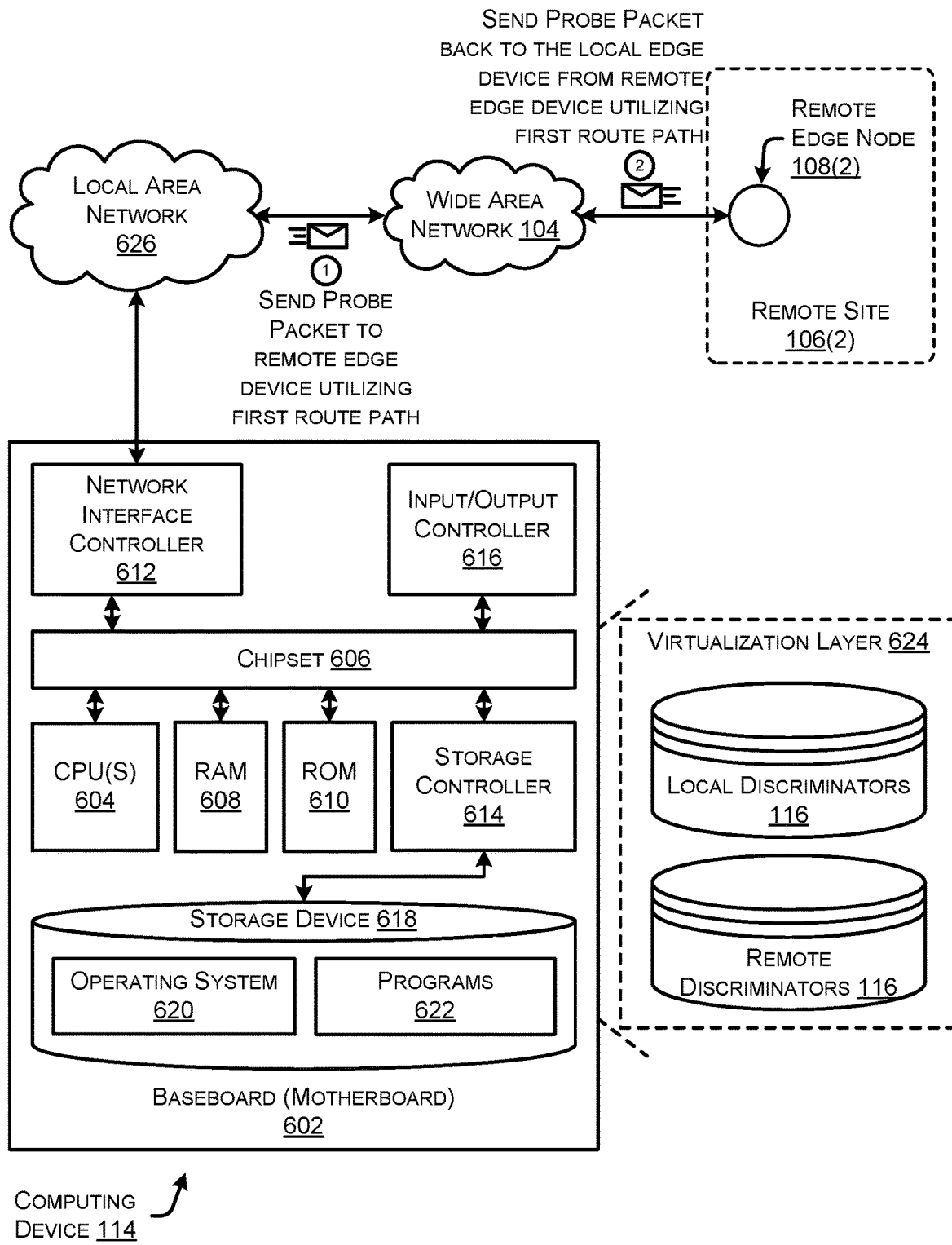
FIG. 6 is a computer architecture diagram showing an illustrative computer hardware architecture for implementing a server device (or node) that can be utilized to implement aspects of the various technologies presented herein.

FIG. 6 shows an example computer architecture for a server computing device 114 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computing device 114 may, in some examples, correspond to a physical server 108 described herein.

The computing device 114 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 114.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 114. The chipset 606 can further provide an interface to a computer-readable storage medium such as a read-only memory ("ROM") 610 or non-volatile RAM ("NVRAM") for storing basic routines that help to startup the computing device 114 and to transfer information between the various components and devices. The ROM 610 or NVRAM can also store other software components necessary for the operation of the computing device 114 in accordance with the configurations described herein.

The computing device 114 can operate in a networked environment using logical connections to remote computing devices and computer systems through a network, such as the network 626. The chipset 606 can include functionality for providing network connectivity through a NIC 612, such as a gigabit Ethernet adapter. The NIC 612 is capable of connecting the computing device 114 to other computing devices over the network 626 (or 120). It should be appreciated that multiple NICs 612 can be present in the computing device 114, connecting the computer to other types of networks and remote computer systems.

The computing device 114 can be connected to a storage device 618 that provides non-volatile storage for the computer. The storage device 618 can store an operating system 620, programs 622, and data, which have been described in greater detail herein. The storage device 618 can be connected to the computing device 114 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 114 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 114 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 114 can further read information from the storage device 618 by detecting the physical states or characteristics of one or more particular locations within the physical storage units.

In addition to the mass storage device 618 described above, the computing device 114 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 114. In some examples, the operations performed by the cloud computing network 102, and or any components included therein, may be supported by one or more devices similar to computing device 114. Stated otherwise, some or all of the operations performed by the cloud computing network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 114. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computing device 114.

In one embodiment, the storage device 618 or other computer-readable storage media is encoded with computer-executable instructions which, when loaded into the computing device 114, transform the computer from a general-purpose computing system into a special-purpose computer capable of implementing the embodiments described herein. These computer-executable instructions transform the computing device 114 by specifying how the CPUs 604 transition between states, as described above. According to one embodiment, the computing device 114 has access to computer-readable storage media storing computer-executable instructions which, when executed by the computing device 114, perform the various processes described above with regard to FIGS. 1-5. The computing device 114 can also include computer-readable storage media having instructions stored thereupon for performing any of the other computer-implemented operations described herein.

The computing device 114 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 114 might not include all of the components shown in FIG. 6, can include other components that are not explicitly shown in FIG. 6, or might utilize an architecture completely different than that shown in FIG. 6.

The server computing device 114 may support a virtualization layer 624, such as an edge node 108 executing on the server computing device 114. In some examples, the virtualization layer 624 may be supported by a hypervisor that provides one or more virtual machines running on the server computing device 114 to perform functions described herein. The virtualization layer 624 may generally support a virtual resource that performs at least portions of the techniques described herein. The edge node 108 may send a probe packet to a remote edge node 108 utilizing a first route path and may receive a probe packet from the remote edge node 108 utilizing the first route path to measure network performance associated with the first route path. In some examples, the virtualization layer may include one or more databases for storing local discriminators and/or local forwarding identifiers 116 and remote discriminators and/or remote forwarding identifiers 116.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   identifying, by a first device in a first site of a multi-site network, a first local discriminator indicating a particular route path of multiple route paths usable to send data from the first device to a second device in a second site of the multi-site network;
   identifying, by the first device, a first remote discriminator indicating the particular route path from the second device to the first device;

generating, by the first device, a first probe packet including the first local discriminator and the first remote discriminator;
utilizing the first local discriminator to send, from the first device, the first probe packet through the particular route path through the multi-site network to the second device;
receiving, at the first device and from the second device, a second probe packet including a second local discriminator associated with the particular route path and a second remote discriminator associated with the particular route path;
determining, by the first device, that the first local discriminator is equal to the second remote discriminator; and
identifying, at the first device and based at least in part on receiving the second probe packet, network performance information associated with the particular route path.

2. The method of claim 1, further comprising:
identifying, by the second device, the second local discriminator based at least in part on the first remote discriminator;
identifying, by the second device, the second remote discriminator based at least in part on the first local discriminator;
generating, by the second device, the second probe packet including the second local discriminator and the second remote discriminator; and
utilizing the second local discriminator to send, from the second device, the second probe packet through the particular route path through the multi-site network to the first device.

3. The method of claim 1, further comprising receiving, at the first device and from a Software-Defined-Networking (SDN) controller associated with the multi-site network, the first local discriminator and the first remote discriminator.

4. The method of claim 1, wherein the network performance information includes an indication of at least one of:
network latency associated with the particular route path;
network packet loss associated with the particular route path;
network delay associated with the particular route path; or
network jitter associated with the particular route path.

5. The method of claim 1, wherein:
the first device is configured as a first edge device of the first site; and
the second device is configured as a second edge device of the second site.

6. The method of claim 1, wherein the particular route path includes one or more intermediate devices disposed between the first device and the second device throughout the multi-site network.

7. The method of claim 1, further comprising:
storing, by the first device, the network performance information in association with the particular route path in a data store associated with the first device; and
sending, from the first device to a Software-Defined-Networking (SDN) controller associated with the multi-site network, the network performance information.

8. A system comprising:
one or more processors; and
one or more non-transitory computer-readable media comprising instructions that, when executed by the one or more processors, cause the one or more processors to perform operations comprising:
identifying, by a first device in a first site of a multi-site network, a local forwarding identifier associated with the first device, the local forwarding identifier indicating a particular route path of multiple route paths usable to send data from the first device to a second device in a second site of the multi-site network;
identifying, by the first device, a remote forwarding identifier associated with the second device, the remote forwarding identifier indicating the particular route path;
generating, by the first device, a probe packet having a first header that includes the remote forwarding identifier;
encapsulating, by the first device, the probe packet with a second header that includes the local forwarding identifier;
sending, from the first device to the second device, the probe packet, wherein the probe packet is configured to utilize the particular route path from the first device to the second device;
receiving, at the first device and from the second device, the probe packet having the first header; and
identifying, at the first device and based at least in part on receiving the probe packet, network performance information associated with the particular route path.

9. The system of claim 8, the operations further comprising:
decapsulating, by the second device, the probe packet to remove the second header that includes the local forwarding identifier; and
sending, from the second device to the first device, the probe packet, wherein the probe packet is configured to utilize the particular route path from the second device to the first device based at least in part on the first header.

10. The system of claim 8, the operations further comprising receiving, at the first device and from a Software-Defined-Networking (SDN) controller, the local forwarding identifier and the remote forwarding identifier.

11. The system of claim 8, wherein the network performance information includes an indication of at least one of:
network latency associated with the particular route path;
network packet loss associated with the particular route path;
network delay associated with the particular route path; or
network jitter associated with the particular route path.

12. The system of claim 8, the operations further comprising:
storing, by the first device, the network performance information in association with the particular route path in a data store associated with the first device; and
sending, from the first device to a Software-Defined-Networking (SDN) controller associated with the multi-site network, the network performance information.

13. The system of claim 8, wherein:
the local forwarding identifier is configured as at least one of:
a first differentiated services code point (DSCP) value; or
a first segment routing segment identifier (SR SID); and
the remote forwarding identifier is configured as at least one of:
a second DSCP value; or
a second SR SID number.

14. The system of claim 8, wherein the particular route path includes one or more intermediate devices disposed between the first device and the second device throughout the multi-site network.

15. A method comprising:
- identifying, by a first device in a first site of a multi-site network, a local forwarding identifier indicating a first route path of multiple route paths usable to send data from the first device to a second device in a second site of the multi-site network;
- identifying, by the first device, a first remote forwarding identifier indicating the first route path usable to send data from the second device to the first device;
- identifying, by the first device, a second remote forwarding identifier indicating a second route path of the multiple route paths usable to send data from the second device to the first device;
- generating, by the first device, a first probe packet having a first outer header that includes the local forwarding identifier and a first inner header that includes the first remote forwarding identifier;
- generating, by the first device, a second probe packet having a second outer header that includes the local forwarding identifier and a second inner header that includes the second remote forwarding identifier;
- sending, from the first device to the second device, the first probe packet and the second probe packet, wherein the first probe packet and the second probe packet are configured to utilize the first route path from the first device to the second device;
- utilizing the first route path to receive, at the first device and from the second device, the first probe packet;
- utilizing the second route path to receive, at the first device and from the second device, the second probe packet; and
- identifying, at the first device and based at least in part on receiving the first probe packet and the second probe packet network performance information associated with the first route path and the second route path.

16. The method of claim 15, wherein the first route path and the second route path include one or more intermediate devices between the first device and the second device throughout the multi-site network, and the one or more intermediate devices are configured as at least one of:
- a multiprotocol label switching (MPLS) circuit;
- a segment routed circuit;
- a pseudowire circuit; or
- an internet circuit.

17. The method of claim 15, wherein the network performance information includes an indication of at least one of:
- network latency associated with at least one of the first route path or the second route path;
- network packet loss associated with at least one of the first route path or the second route path;
- network delay associated with at least one of the first route path or the second route path; or
- network jitter associated with at least one of the first route path or the second route path.

18. The method of claim 15, wherein the network performance information includes first network performance information associated with the first route path and second network performance information associated with the second route path, and the method further comprising:
- determining, by the first device, that the first route path is more favorable than the second route path based at least in part on the first network performance information and the second network performance information;
- storing, by the first device, the indication in a data store associated with the first device; and
- sending, from the first device to a Software-Defined-Networking (SDN) controller associated with the multi-site network, the indication.

19. The method of claim 15, wherein the local forwarding identifier is a first local forwarding identifier, and the method further comprising:
- decapsulating, by the second device, the first probe packet to remove the first outer header that includes the local forwarding identifier;
- decapsulating, by the second device, the second probe packet to remove the second outer header that includes the local forwarding identifier;
- sending, from the second device to the first device, the first probe packet, wherein the first probe packet is configured to utilize the first route path from the second device to the first device based at least in part on the first inner header; and
- sending, from the second device to the first device, the second probe packet, wherein the second probe packet is configured to utilize the second route path from the second device to the first device based at least in part on the second inner header.

20. The method of claim 15, wherein the network performance information includes first network performance information associated with the first route path and second network performance information associated with the second route path, and the method further comprising:
- identifying, by the first device, a first timestamp at a first time at which the first probe packet and the second probe packet are sent from the first device to the second device;
- identifying, by the first device, a second timestamp at a second time at which the first probe packet is received at the first device from the second device;
- identifying, by the first device, a third timestamp at a third time at which the second probe packet is received at the first device from the second device;
- identifying the first network performance information associated with the first route path based at least in part on the first timestamp and the second timestamp; and
- identifying the second network performance information associated with the second route path based at least in part on the first timestamp and the third timestamp.

* * * * *